(No Model.)
W. M. DE VOE.
CAMERA.
No. 250,214. Patented Nov. 29, 1881.
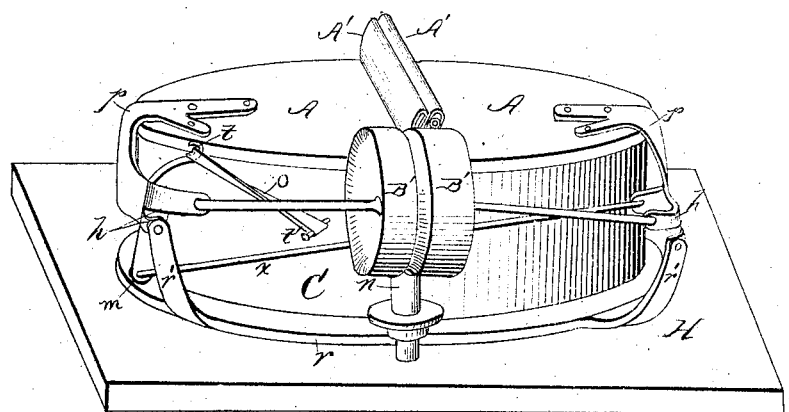
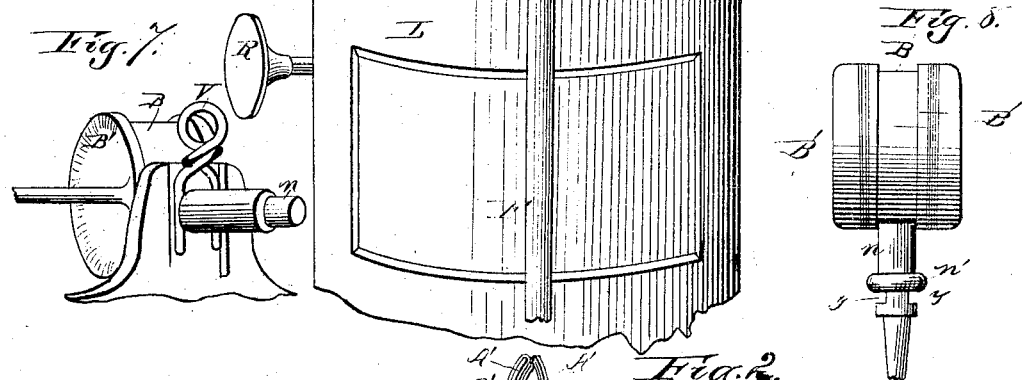
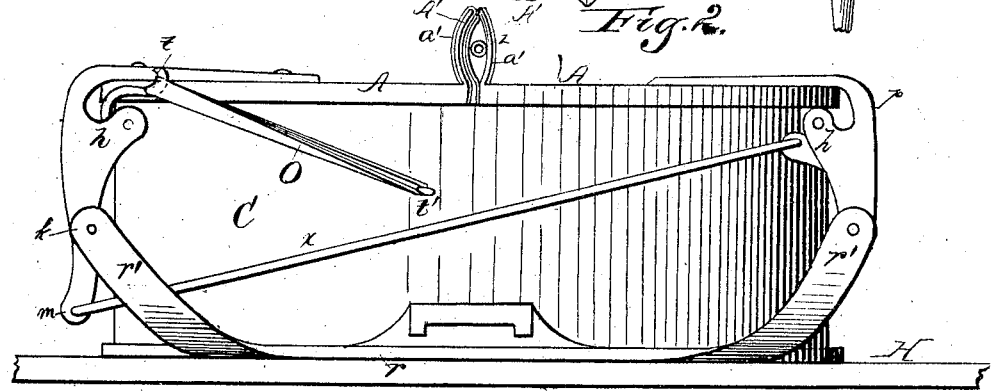
Witnesses:
N. C. McArthur
W. R. Keyworth
Inventor
W. M. De Voe
per J. H. MacDonald
Attorney.
2 Sheets—Sheet 1.

(No Model.) 2 Sheets—Sheet 2.
W. M. DE VOE.
CAMERA.
No. 250,214. Patented Nov. 29, 1881.
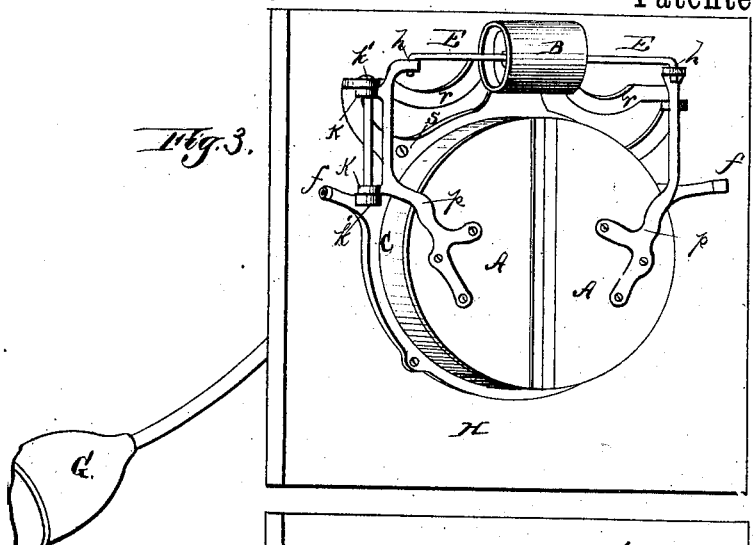
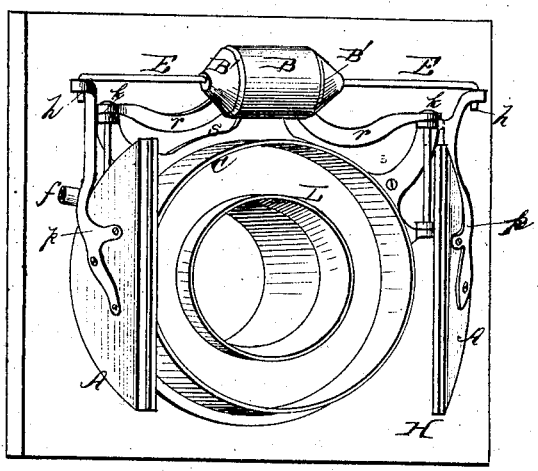
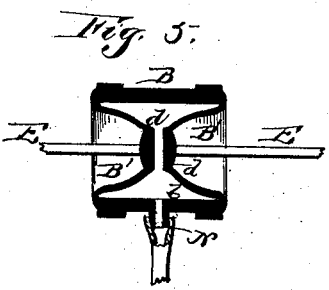
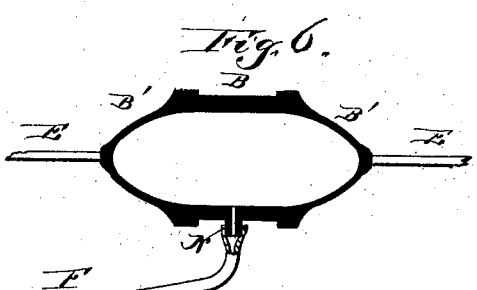
Witnesses:
H. C. McArthur
W. R. Keyworth
Inventor
W. M. De Voe,
per J. H. MacDonald
Attorney.

UNITED STATES PATENT OFFICE.

WESLEY M. DE VOE, OF URBANA, OHIO, ASSIGNOR OF TWO-THIRDS TO RALPH BUCHANAN AND A. H. McFARLAND, BOTH OF SAME PLACE.

CAMERA.

SPECIFICATION forming part of Letters Patent No. 250,214, dated November 29, 1881.

Application filed July 12, 1881. (No model.)

*To all whom it may concern:*

Be it known that I, W. M. DE VOE, a citizen of the United States, residing at Urbana, in the county of Champaign and State of Ohio, have invented certain new and useful Improvements in Cameras; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

In the drawings, Figure 1 is a perspective view of my improved apparatus, showing the method of its attachment to the movable front board of a camera and its position with reference to the lens-tube, said movable front board being here shown as detached from the camera. Fig. 2 is a side elevation of the apparatus; Fig. 3, a rear perspective view, showing the shutters closed; Fig. 4, a perspective view, showing the shutters opened. Figs. 5, 6, 7, and 8 are detail views of the several parts, and will be more fully described hereinafter.

The object of my invention is to enable an operator to easily uncover or cover the lens-tube, so as to admit or exclude light from the camera, while standing at any desired distance from the camera, thus having full control over the exposure of the sensitized plate.

The invention consists, first, in a camera-shutter made in two parts, which are hinged or pivoted upon axes at right angles to the axis of the lens-tube, and capable of occupying a plane parallel to the rear or inner end of the lens-tube, and of being swung rearward and apart, so as to uncover the lens-tube.

It further consists in a camera-shutter made in two parts, provided with pivotal bearings or hinges actuated by a rod secured to said pivotal hinges and an air-chamber.

It consists, further, in a collapsible air-chamber actuating rods secured to the ends of said air-chamber and the pivoted hinges secured to the movable shutters.

It lastly consists in details of construction that will be hereinafter more fully set forth in the specification and claims and pointed out in the drawings.

In the application of my invention I attach to or upon the rear or inner side of the front board, H, of a camera a metal plate, $r$, which has the form shown in Figs. 1, 2, 3, and 4, and which is provided with a rearward-projecting ring or short tube, C, that surrounds the opening in said front board, through which passes the lens-tube L.

Pivoted or hinged to or upon two ears which project laterally and rearward from the plate $r$, and at opposite sides thereof, are two arms or hinges, $p$, capable of swinging in a horizontal plane from the position shown in Fig. 3 to that shown in Fig. 4.

To or upon each arm or hinge $p$ is secured a plate or shutter, A, which has the form of a half-circle, and, in connection with the opposite shutter, has such dimensions as to enable it to cover the rear end of the ring or tube C and prevent the passage of light through the lens L.

In Figs. 1 and 2 the arms $p$ are hinged in front of the face of the ring C at a point between the plane of the attachment to the front board and the plane occupied by the shutter-leaves A when closed, and cause the latter, when opened, to be moved to the position shown in Fig. 4, the edge of each shutter being carried forward, so as to require less space in the rear of said ring within which to swing than would be necessary if the pivot or hinge were upon a line with the rear face of said ring.

Secured upon the plate $r$ midway between the upper ends of the arms or hinges $p$ is a collapsible air-chamber, B, which is capable of being distended and collapsed, and when distended has the general form of an ellipse, as shown in Figs. 4 and 6, and when collapsed has the general form of a short cylinder, as shown in Figs. 1, 3, and 5. This air-chamber B is intended to distend and collapse lengthwise only, and in order that such will always be the case its central longitudinal portion is thickened circumferentially, or is preferably constructed of sheet metal or other suitable substance, so as to be able to resist the lateral pressure of the air. The ends $d$ of said air-chamber are also thickened, and to each is attached one end of a rod or wire, E, the opposite end of which extends to and is pivoted to or upon the contiguous arm p, the length of the rod and the point of its attachment to said arm being such as to cause the shutter-leaf A to be closed when said air-chamber is collapsed and to open when said air-chamber is distended. The portion of air-chamber B shown at B' in Figs. 5 and 6 is made of sufficient thinness to allow it to collapse inwardly by the pressure of the air outside upon the withdrawal of the air from the interior of said air-chamber. At some point, preferably at the front central portion, the air-chamber B is provided with a nozzle, N, to which is attached one end of a rubber tube, the opposite end of which is to be provided with an ordinary syringe-bulb, G, the arrangement being such as to enable an operator to distend said air-chamber B and open the shutters A, when desired, by giving bulb G sufficient pressure to force the contained air into chamber B.

It is intended that the air-chamber B shall be collapsed in its normal condition and automatically return to such position when the bulb G is released from pressure; but, if desired, a spring of coiled wire or rubber band, o, may be attached to the arms p and to collar c, as shown at t t' in Figs. 1 and 2.

In order to equalize the pressure of the air-chamber B and cause the arms p and shutter-leaves A to move in unison, the arms p are connected by a rod, x, attached to projections on arms p on opposite sides of pivot k, as shown in Figs. 1 and 2. The nozzle N of the air-chamber B is passed through a hole in the plate r and secured by a key, v, which passes through opposite notches, y, in the nozzle N, thus holding the chamber B firmly in position, as shown in Figs. 7 and 8.

In order to effectually exclude the light from the interior of the camera when the shutter is closed, the shutter-leaves A are bent at right angles, which bent portion is curved, so as to present opposing concave surfaces to each other when closed. Each shutter-leaf is lined with velvet, which is drawn over this concave surface and secured on the back of this projection A'. In the space thus left under said velvet is placed a piece of rubber tubing, z, or other elastic substance, so as to cause the convex surface to press the velvet on the opposite side into the concavity of the opposite edge, thus positively insuring the exclusion of light.

This apparatus can be applied to cameras having considerable difference in size, as but little space is required at the opposite sides or in the rear for the operation of parts. It can also be used with lenses of different size, as the apparatus works independently of the lens-tube, said lens-tube being removable without affecting the working of the shutter.

The operation of the apparatus is automatic and certain, the parts not being liable to become deranged so as to fail to exclude light from the camera. The operation is completely under the control of the operator, who can from any suitable point open or close the shutter without the movement being seen by the sitter and without deranging the focus.

Having thus described my invention, what I claim as new, and desire to secure by Letters Patent, is—

1. A camera-shutter made in two parts, provided with pivotal bearings or hinges, and actuated by a rod secured to said hinges and to the extremities of an air-chamber, substantially as set forth.

2. In a camera, a collapsible air-chamber, and actuating rods secured to the ends of said air-chamber and to pivoted hinges secured to the movable shutters, substantially as described.

3. In a camera having a shutter made in two parts, the arms or hinges p, secured to said shutter-leaves and pivoted to ears which project laterally and rearward from the plate r, and adapted to move in a horizontal plane when the shutter-leaves are moved to their opened position, substantially as shown and described.

4. In a camera, a collapsible air-chamber, B, secured upon the plate r midway between the upper ends of the hinges p, to which the shutter-leaves are secured, substantially as set forth.

5. A camera provided with an air-chamber, B, having its central portion constructed of rubber or other suitable material and thickened circumferentially, so as to resist the lateral pressure of the air, and adapted to distend and collapse lengthwise of the air-chamber, as shown and described.

6. A camera provided with a collapsible air-chamber, B, having its longitudinal central portion thickened circumferentially, and its ends d also thickened, substantially as and for the purpose set forth.

7. A camera provided with an air-chamber, as described, to each end of which is secured one end of a rod or wire, E, the opposite ends of which extend to and are pivot d to the contiguous arm of a hinge secured to one leaf of the camera-shutter, substantially as shown and described.

8. A camera having an air-chamber which distends and collapses in the direction of its length, and provided with rods attached to each end of the air-bulb and to pivoted hinges secured to the shutter-leaves, the length of said rods and the point of their attachment to said pivoted hinges or arms being such as to cause the shutter-leaves to be closed when the chamber is collapsed and to open when the chamber is distended, substantially as shown and described.

9. A camera provided with an air-chamber having a rod secured to each end thereof and to pivoted arms p, attached to the shutter-leaves, said arms being connected to a rod, x, attached to projections to said arms on opposite sides of pivot k, whereby the arms p and shutter-leaves are caused to move in unison, substantially as described.

10. A camera provided with an air-chamber,

B, having a nozzle, N, passing through a hole in the plate r, and secured by a key, v, passing through opposite notches, y, in the nozzle, thereby holding the said chamber firmly in position, as set forth.

11. A camera provided with movable shutter-leaves, the inner edges of which are bent and curved, so as to present opposing concave surfaces to each other when closed, thus entirely excluding the light from the interior of the camera when the shutters are closed, as set forth.

12. A camera provided with movable shutters, the inner edges of which are bent and curved, as described, said bent portions being covered with velvet, which is drawn over the bent portions and fastened to the back of the projections, as and for the purpose set forth.

13. A camera provided with movable shutter-leaves having bent portions covered with velvet, as described, and having in the space underneath said velvet a piece of rubber tubing or other elastic substance, z, so as to cause the convex surface of the velvet on one edge to be pressed into the concavity of the opposite edge, thus insuring the exclusion of light, substantially as set forth.

14. In a camera, the combination of a camera-tube, a cup-shaped air-chamber, B, connecting-rods x, plate r, and air-bulb G, substantially as constructed, and for the purpose set forth.

In testimony whereof I affix my signature in presence of two witnesses.

WESLEY M. DE VOE.

Witnesses:
W. W. HELMICK,
C. C. GLESSNER.